(12) United States Patent
Kambhammettu et al.

(10) Patent No.: US 7,065,767 B2
(45) Date of Patent: Jun. 20, 2006

(54) MANAGED HOSTING SERVER AUDITING AND CHANGE TRACKING

(75) Inventors: Venkatesh Kambhammettu, Portland, OR (US); John J. Theisen, Beaverton, OR (US); Ryan C. Faris, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 09/895,716

(22) Filed: Jun. 29, 2001

(65) Prior Publication Data

US 2003/0005109 A1    Jan. 2, 2003

(51) Int. Cl.
*G06F 15/163*    (2006.01)
(52) U.S. Cl. .................................. 719/310; 714/100
(58) Field of Classification Search ............... 709/224; 719/224, 310; 714/100
See application file for complete search history.

(56) References Cited

U.S. PATENT DOCUMENTS

| | | | | |
|---|---|---|---|---|
| 5,923,850 A | * | 7/1999 | Barroux | 709/224 |
| 6,212,531 B1 | * | 4/2001 | Blea et al. | 707/204 |
| 6,219,676 B1 | * | 4/2001 | Reiner | 707/201 |
| 6,282,175 B1 | * | 8/2001 | Steele et al. | 370/254 |
| 6,519,763 B1 | * | 2/2003 | Kaufer et al. | 717/101 |
| 6,530,065 B1 | * | 3/2003 | McDonald et al. | 716/4 |

OTHER PUBLICATIONS

Jim Whitehead, Re: Snapshots, Apr. 2, 1999.*
Brain Tree, Policy Manager, 1998.*
Michael L. Nelson, The NASA technical Report Server, 1995.*

* cited by examiner

*Primary Examiner*—Meng-Al T. An
*Assistant Examiner*—LeChi Truong
(74) *Attorney, Agent, or Firm*—Blakely, Sokoloff, Taylor & Zafman LLP (57) ABSTRACT

A method and apparatus are described for auditing and tracking changes in a managed hosting server. Embodiments of the present invention track changes made to systems in a server farm or data center. More specifically, embodiments of the present invention track changes to the operating system, file system, registry, application software files, and other important files and maintain the changes in a database. This database of changes can then be queried to identify the root cause of problems and aid in systems and applications management in the data center.

29 Claims, 8 Drawing Sheets

MANAGED HOSTING SERVER AUDITING AND CHANGE TRACKING

FIELD OF THE INVENTION

The invention relates generally to the field of computer network management. More particularly, the invention relates to auditing and tracking changes in a managed hosting server.

BACKGROUND OF THE INVENTION

Changes to the software of a computer system are a risk to system security, stability and performance. By tracking changes, a system administrator can measure the risk impact to a system and predict the problems changes can cause before they occur and can take actions to prevent failure. Change tracking is particularly important in a managed hosting environment where a service provider supplies equipment such as servers for a customer to use for purposes such as web page hosting. Normally, these service providers allow customers access to their servers for the customers' use and guarantee the availability or uptime of the server. Therefore, the service provider has an interest in preventing problems that could lead to the servers being unavailable. For this reason, service providers may wish to track changes made to the server's software in an effort to analyze the risk of such changes, avoid problems caused by changes, and aid in problem resolution and recovery. Additionally, change tracking can aid in intrusion detection, infrastructure control and configuration management, and system management, such as backups and rollbacks.

However, the joint-ownership model complicates tracking of changes in such a managed hosting environment. That is, both the customer and the provider "own" and have access to the servers in use by the customer. Both parties also have tasks, such as maintenance, that must be performed on the servers. Because of this joint-ownership, it is not always possible to determine who is responsible for changes that may create problems for the system.

Since both the customer and the service provider may make changes to the system, both parties could be made responsible for tracking their own changes. However, such division of responsibilities could lead only to finger pointing in the event of problems. Additionally, most service providers would not want to rely on customers in such a manner since it is the service provider that is responsible for the availability of the servers, not customers.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

A method and apparatus are described for auditing and tracking changes in a managed hosting server. Embodiments of the present invention track changes made to systems in a server farm or data center. More specifically, embodiments of the present invention track changes to the operating system, file system, registry, application software files, and/or other important files and maintains the changes in a database. This database of changes can then be queried to identify the root cause of problems and aid in systems and applications management in the data center.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various processes, which will be described below. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Figure 1:
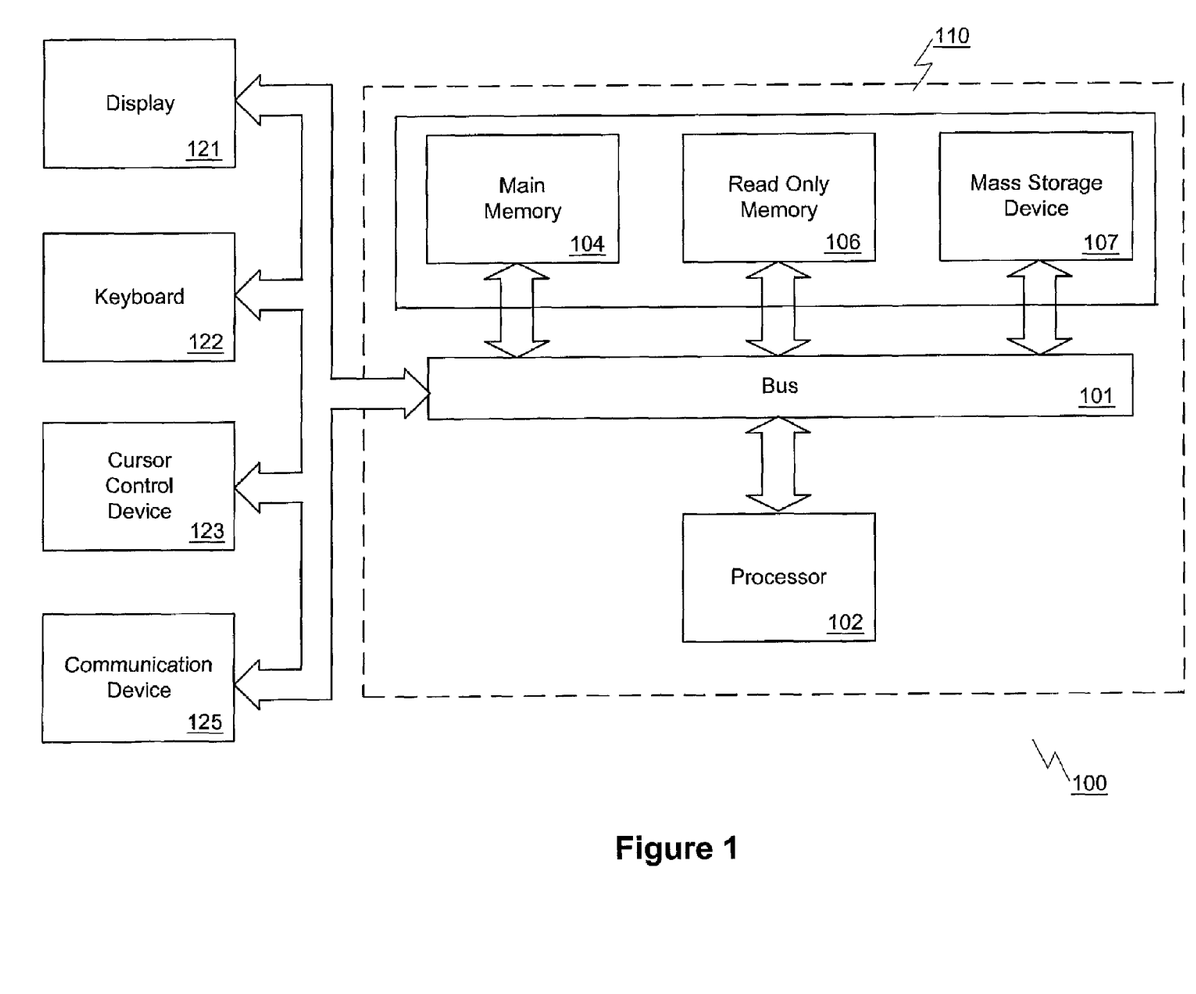
FIG. 1 is a block diagram illustrating a typical computer system upon which embodiments of the present invention may be implemented.

FIG. 1 is a block diagram illustrating a typical computer system upon which embodiments of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited steps are performed by a specific combination of hardware components.

Conceptually, the present invention tracks changes made to systems in a server farm or data center. More specifically, the present invention tracks changes to the operating system, file system, registry, application software files, and/or other important files and maintains the changes in a database. This database of changes can then be queried to identify the root cause of problems and aid in systems and applications management in the data center.

Figure 2:
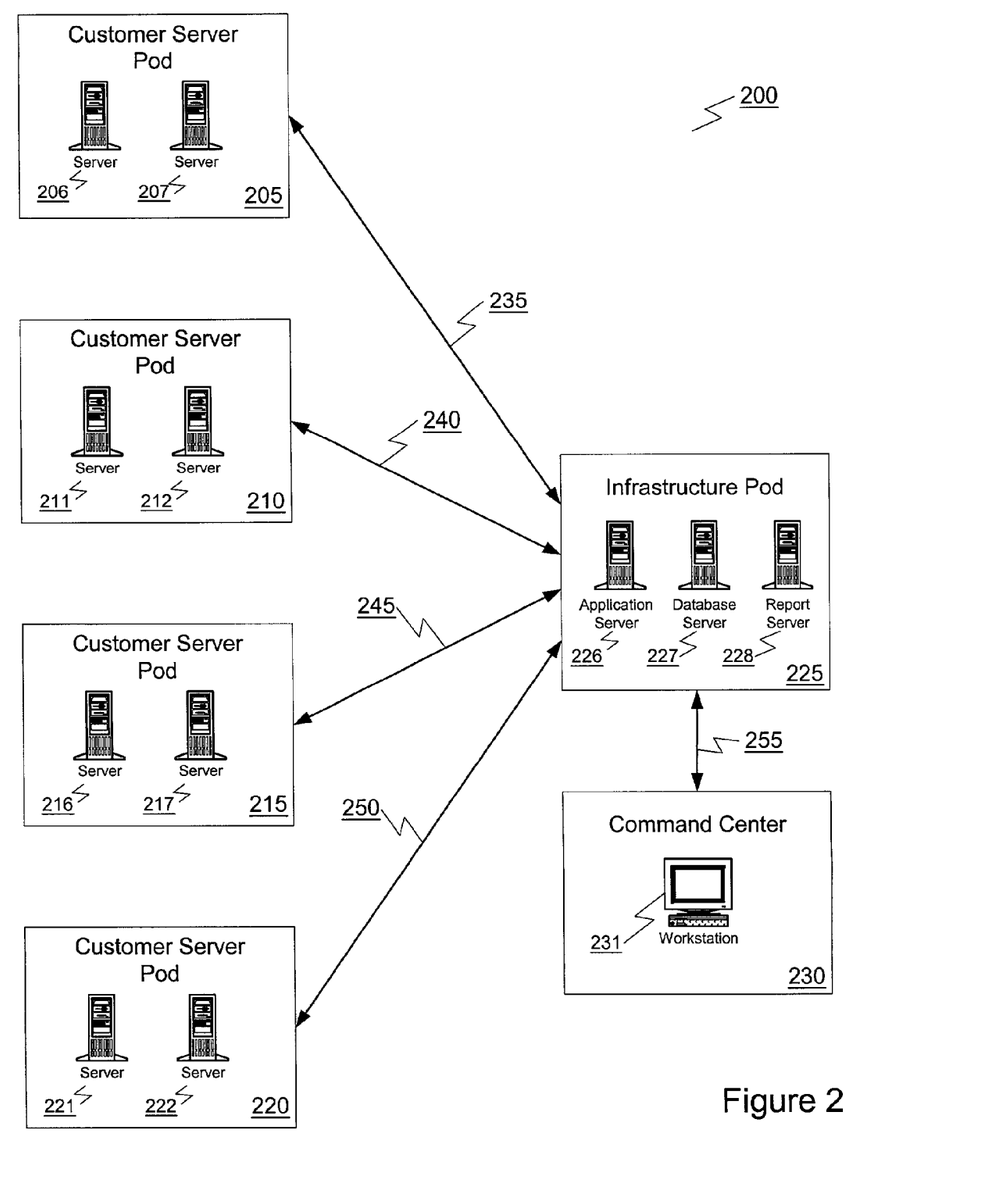
FIG. 2 is a block diagram illustrating a computer network or data center upon which embodiments of the present invention may be implemented.

FIG. 2 is a block diagram illustrating a computer network or data center upon which embodiments of the present invention may be implemented. The system 200 illustrated in this example includes customer server pods 205, 210, 215, and 220. These pods include servers 206, 207, 211, 221, 216, 217, 221, and 222. This example shows four customer server pods 205, 210, 215, and 220 each containing two servers. Depending on the particular application, there may be more or fewer customer server pods, or more or fewer servers per customer server pod. According to one embodiment of the present invention, each customer server pod 205, 210, 215, and 220 is connected with an infrastructure pod 225 via a network connection 235, 240, 245, and 250. These network connections may employ various topologies and standard communications protocols as are well known in the art.

According to one embodiment of the present invention, the infrastructure pod 225 contains three servers 226–228. These are the application server 226, the database server 227, and the report server 228. The individual functions of each of these servers 226–228 will be described below with reference to FIG. 4. Generally, the purpose of the infrastructure pod 225 is to track changes such as additions, deletions, and updates to the file system and registry as well as changes to file permissions, accounts, passwords and text file contents and to allow for management of the entire system 200 via a command center 230. The infrastructure pod 225 is connected to the command center 230 via a network connection 255. The command center 230 contains a workstation 231 that can be used by a human operator to administer and maintain the servers 226–228 of the infrastructure pod 225. In alternative embodiments of the present invention, the function of the three servers 226–228 in the infrastructure pod may be distributed over more or less servers. For example, the tracking and management functions of the infrastructure pod 225 may be performed by a single machine.

Figure 3:
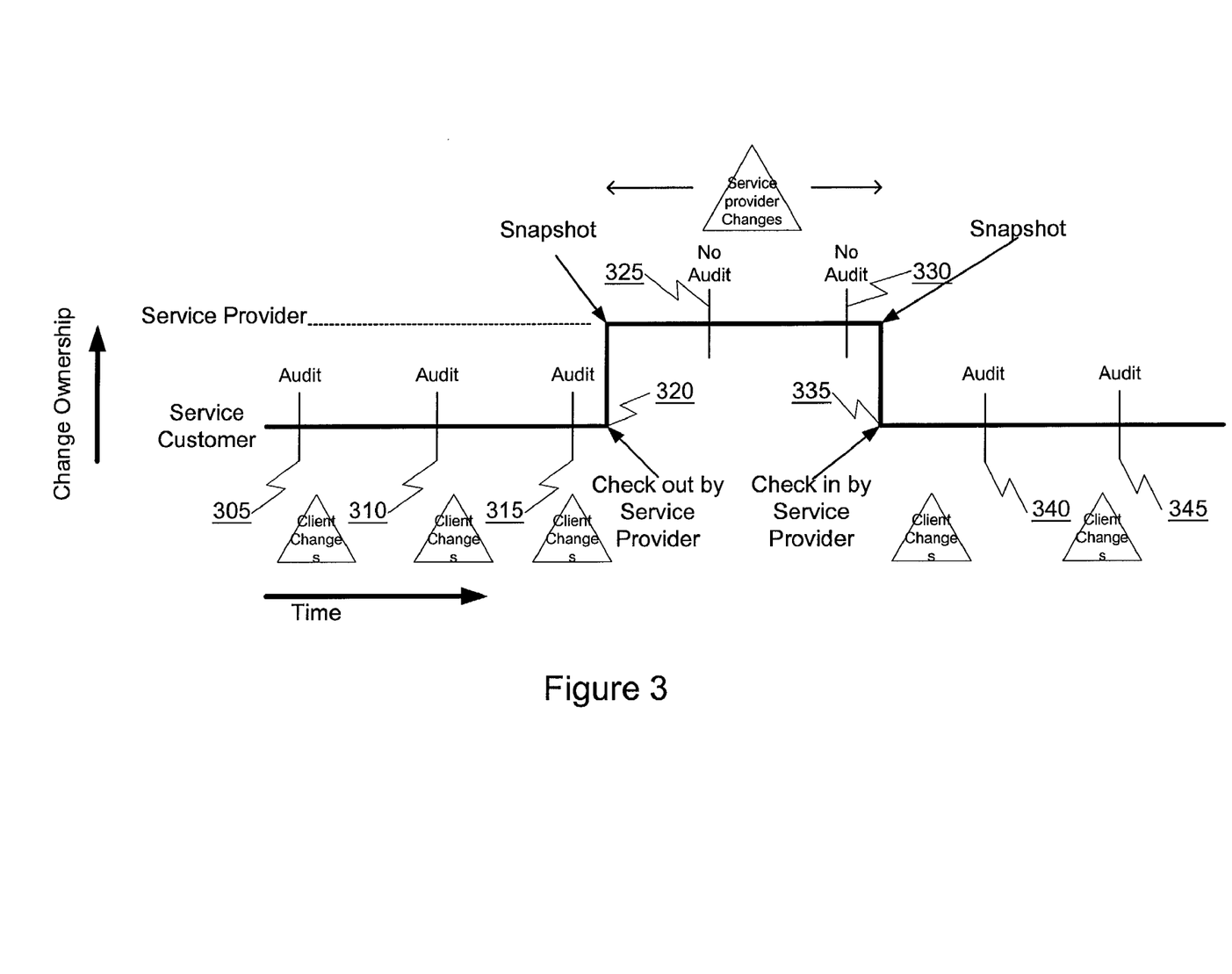
FIG. 3 is a timing diagram illustrating change tracking events according to one embodiment of the present invention.

FIG. 3 is a timing diagram illustrating change tracking events according to one embodiment of the present invention. According to one embodiment of the present invention, a check-out and check-in process is used for resolving responsibility for changes made to the system. This check-out and check-in process takes a snapshot of a collection of particular data described further below before and after major changes are applied to the system by a customer. The customer checking out the system is then associated with the changes made between the check-out and checkin.

In the example illustrated in FIG. 3, control of a particular server can belong to either the customer or the service provider. Generally, the customer will have control of the server as is the case at point 305. Also at this point 305, an audit is performed. This audit is used to establish a baseline for the condition of the server. That is, the system creates a base snapshot for future comparison by collecting particular data from the server. Details of this data will be discussed below with reference to FIGS. 4–8.

Audits are then scheduled to be performed periodically at points 310, 315, 325, 330, 340, and 345. At each audit, the data collected from the system is compared to the data of the previous audit to determine what changes have been made to the system. The exception to these periodic audits is when the system has been checked out by the service provider as demonstrated at point 320. At this point 320, control of the system passes to the service provider who may then make changes to the system. Also, at this point 320, a snapshot of the system similar to the periodic audits is taken. Later, at point 335, the service provider checks in the system. At this point, another snapshot of the system is taken for comparison to the snapshot taken at check out 320. This comparison is used to determine what changes were made to the system by the service provider. Additionally, between check out 320 and check in 335, the periodic audits are suspended and no audits are performed at points 325 and 330.

Using the check out and check in system, control of the server and responsibility for changes can be determined. While control belongs to the customer, all changes, detected by comparing data from the periodic audits, are the responsibility of the customer. While control belongs to the service provider, all changes, detected by comparing the snapshots made at check out and check in, are the responsibility of the service provider.

Figure 4:
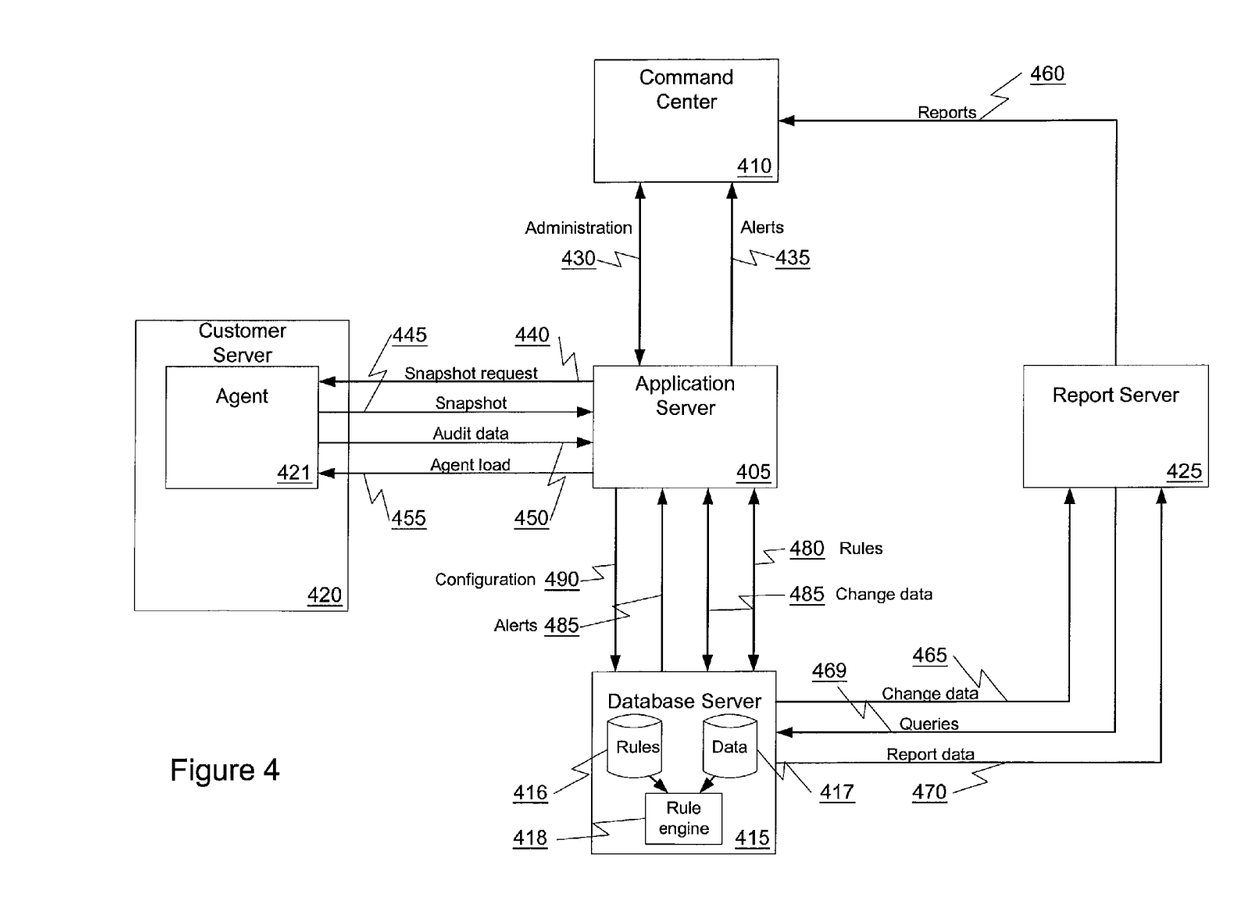
FIG. 4 is a block diagram illustrating a system for change tracking according to one embodiment of the present invention.

FIG. 4 is a block diagram illustrating a system for change tracking according to one embodiment of the present invention. In this example, there are five key components for the system: a data collector or agent 421 on the customer server 420; an application server 405 functioning as a change detector; a report server 425; a database server 415 containing a rule engine 418; and a command center 410.

The data collector or agent 421 is resident on the customer server 420. The agent 421 responds to a snapshot request 440 from the application server 405 directing the agent to capture a snapshot of the customer server 420. The snapshot request 440 is typically made when the customer server 420 is to be checked out by the service provider. The customer server transmits 445 the snapshot back to the application server. Additionally, the agent 421 performs the periodic audits on the customer server 420 and sends 450 the audit data to the application server 405.

According to one embodiment, the agent can be loaded 455 onto the customer server 420 from the application server 405. According to one embodiment, agents are operating system specific. Therefore, the agent 421 can be tailored to whatever operating system the customer server 420 is running. The agent 421 should be small to minimize its demands on the resources of the customer server 421. Additionally, the agent 421 should be designed to allow for easy expandability by allowing plugins to be dynamically added to the agent.

The application server 405 requests snapshots 440 from the customer server 420 and at regular intervals accepts audit data 450. The application server 405 then detects changes made to the customer server 420 by comparing the audit data and stores the change data 485 in a database server 415. The application server 405 determines changes by comparing the previous audit data with the current audit data. Changes made between snapshots when the system is checked out and checked in are determined in the same manner by comparing snapshots. Audit data and snapshot data may be stored compressed and encrypted to be secure, use less memory, and provide faster access. According to one embodiment of the present invention, this data is stored in a text file and compressed using a common compression tool such as gzip. These files contain headers that include a time stamp indicating when the data was collected. The data can then be sorted to make useful comparisons.

The application server 405 may also allow baselining. That is, the application server 405 may create a base snapshot for future comparison. This baseline can then be used for comparison to future snapshots or audit data or to aid in troubleshooting or system recovery of the customer server 420. This baseline data may also be stored compressed and/or encrypted.

The report server 425 provides a graphical user interface to the command center 410 for viewing analyzed results or reports 460. The report server 425 queries 469 the database server 415 and, in response, receives report data 470. Report data 470 can include summaries of changes, when they were made, and/or who the responsible party was. This data is then presented as reports 460 to the command center 410. The queries can be made by date/time, by application categories, or by alerts.

The database server 415 is comprised of a schema that enables storing system information 417 related to changes such as additions, deletions, or updates and the responsible party as entities and attributes in relational tables. The schema can also store rules 416 and policies related to system changes in relational tables. It can also have a compilation of change rules that are applicable to system security, performance and stability. The database server 415 also contains a rule engine 418 for comparing and correlating present data with last known data and reacting appropriately with alerts 485, emails, etc.

The rule engine 418 contains rule sets for the registry, various databases etc. These rules help specify policies related to an application and represent conditions to search for in the data 417. For example, a rule can require a check for the existence of a specific registry key with a specific value and return a true/false value accordingly. Therefore, rules provide a systematic way for specifying and managing change policies for a system.

According to one embodiment of the present invention, the audit data and rules are correlated to failures, security attacks, and violations of usage policies. This correlation allows for the development of change patterns that can be matched against future changes to predict impending failure, violations, or threats. The rules are algorithmically applied to changes as and when they are detected and appropriate action is taken based on the "alert" specified with the rule.

An alert is a notification or action that needs to be taken when a rule is met or violated. For example, an alert can be created to notify the administrator or human operator if a registry entry has been changed. The rule engine 418 of the database server 415 generates the alert after applying the rules 416 to the collected data 417. Any alerts generated are passed 485 to the application server 405 and then passed on 435 to the command center 410. All alerts will also be logged in the database server 415 for reporting later.

As indicated above, the command center 410 is configured to notify a human operator of any alerts generated. Additionally, the command center 410 is used for system administration 430. That is, by using a graphical user interface an administrator can configure customer server data, perform rule and alert maintenance, and perform automatic snapshot configuration.

Figure 5:
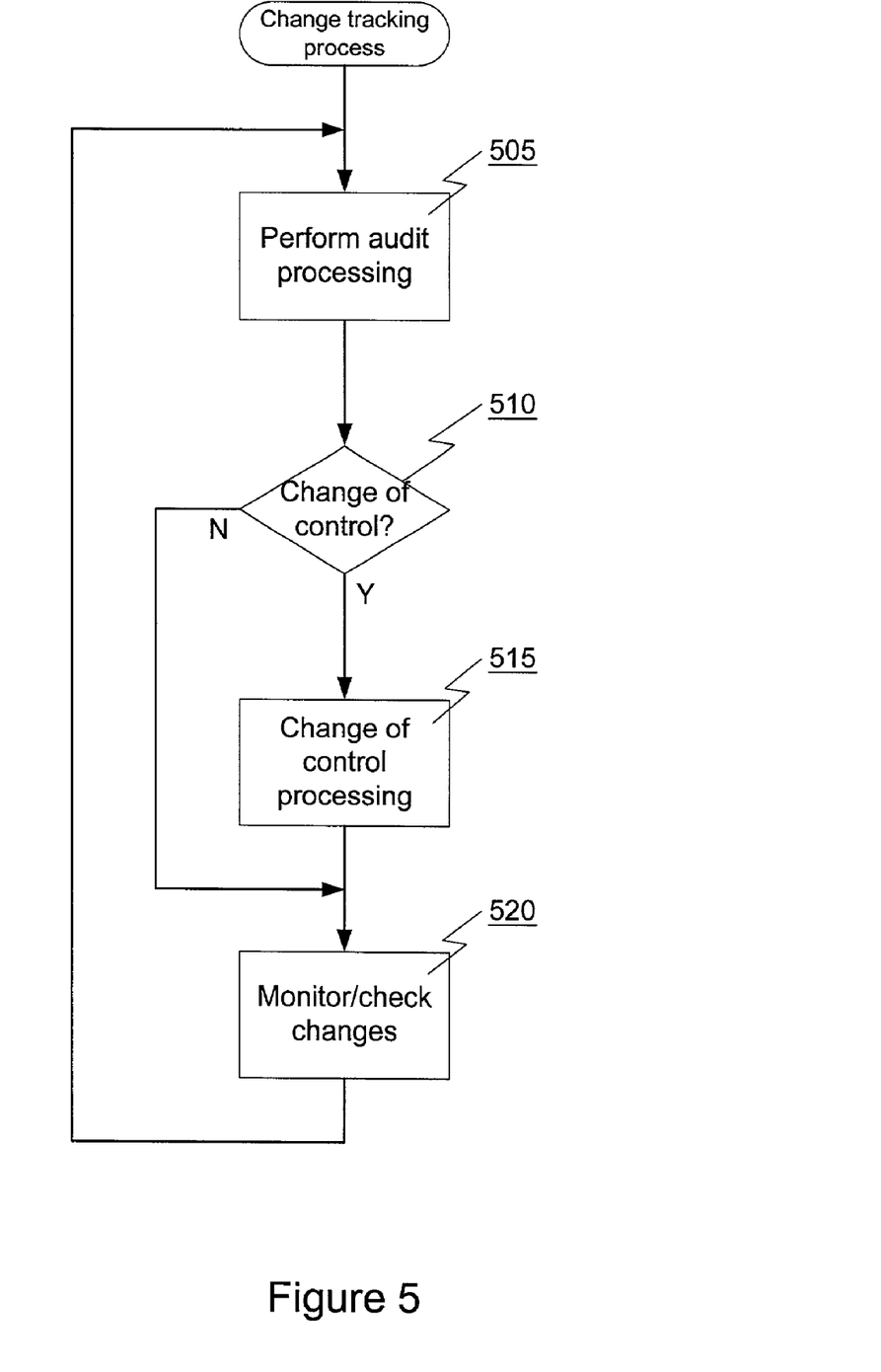
FIG. 5 is a flowchart illustrating a high-level view of a change tracking process according to one embodiment of the present invention.

FIG. 5 is a flowchart illustrating a high-level view of a change tracking process according to one embodiment of the present invention. Initially, at processing block 505, audit processing is performed. Details of audit processing are described below with reference to FIG. 6. Next, at decision block 510, a determination of whether the system has been checked out is made. If the system has been checked out, the change of control process is executed at processing block 515. Details of this process are described below with reference to FIG. 7. Finally, at processing block 520, any changes detected in the audit data are checked against the rules. Details of this process will be discussed below with reference to FIG. 8.

Figure 6:
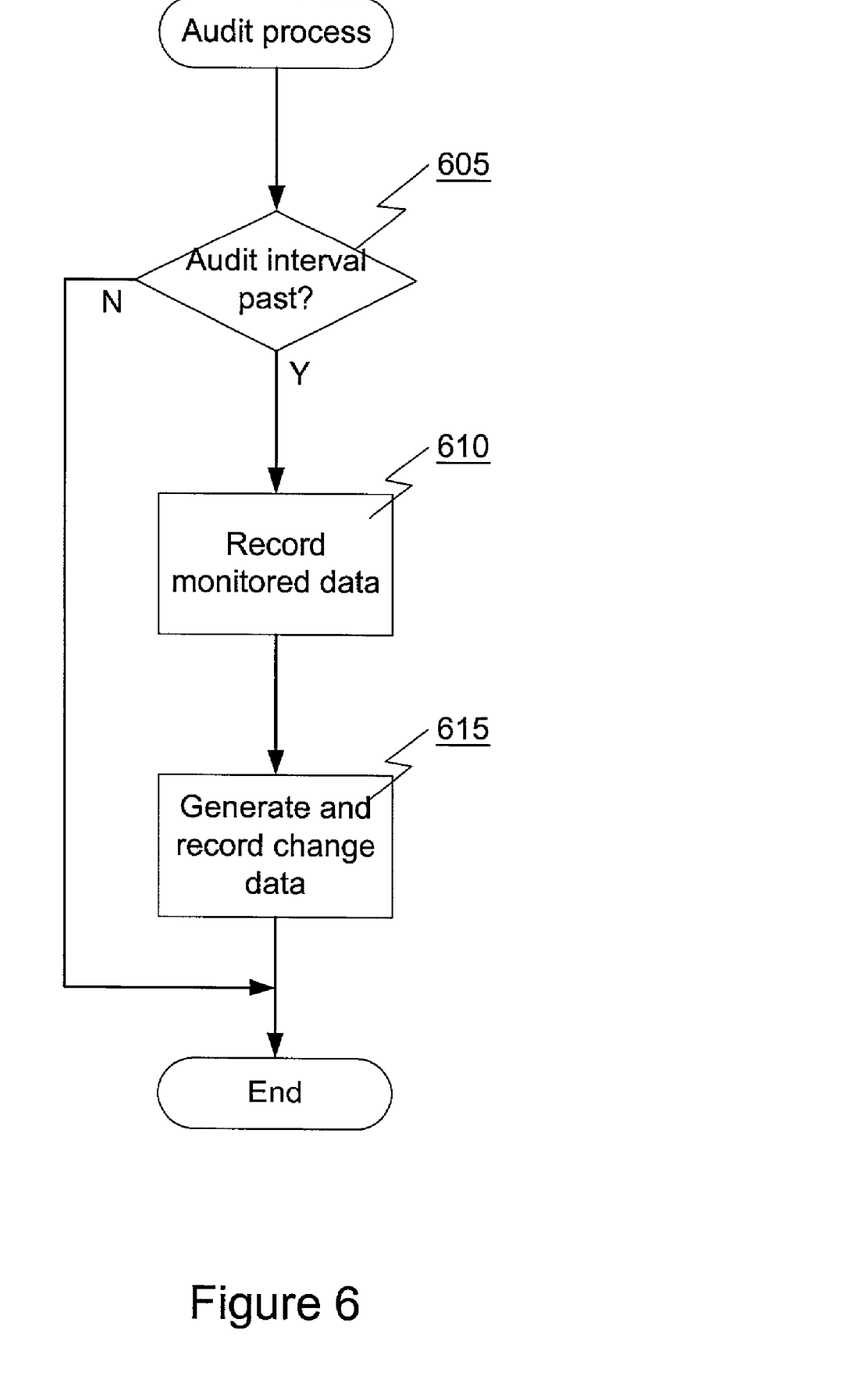
FIG. 6 is a flowchart illustrating an audit process according to one embodiment of the present invention.

FIG. 6 is a flowchart illustrating an audit process according to one embodiment of the present invention. If, at decision block 605, the predetermined interval between audits (the audit interval) has passed, the monitored data is recorded at processing block 610. The monitored data can include file system and registry data such as additions, deletions, or modifications to the file system or registry or changes in file permissions, user accounts or passwords. From this monitored data, change data is generated and recorded at processing block 615 by comparing the last known condition with the present condition.

Figure 7:
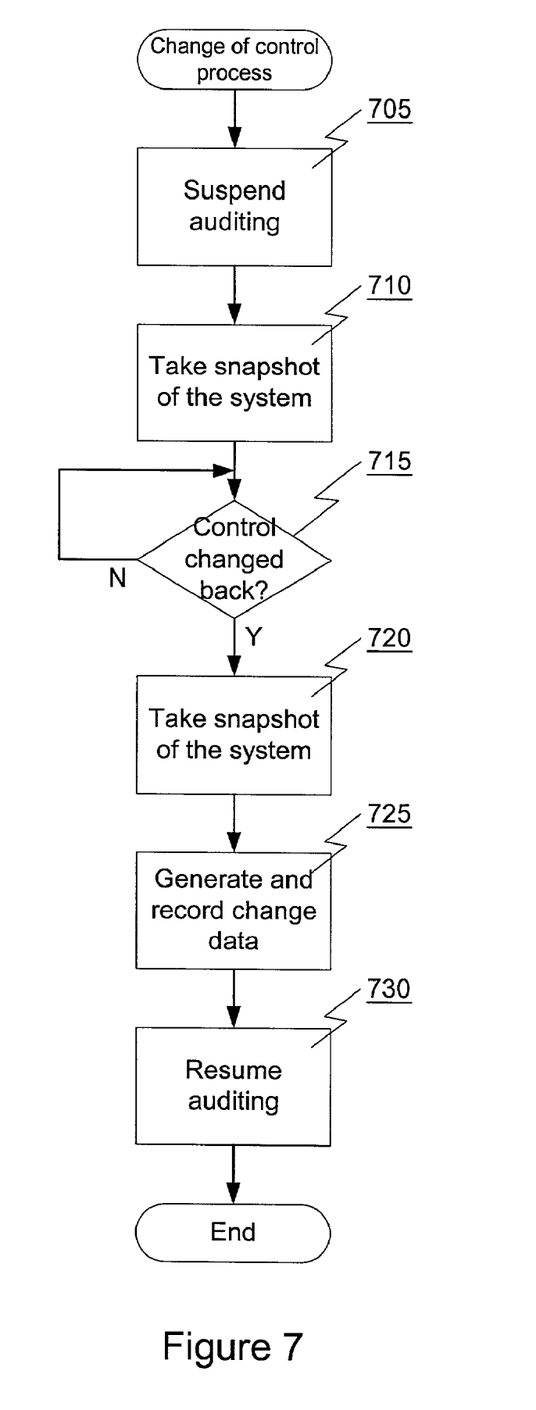
FIG. 7 is a flowchart illustrating a change of control process according to one embodiment of the present invention.

FIG. 7 is a flowchart illustrating a change of control process according to one embodiment of the present invention. First, at processing block 705, the periodic auditing of the customer server is suspended. Next, at processing block 710 a snapshot of the customer server is taken. This snapshot should include all data monitored by the periodic auditing. If, at decision block 715, control is changed back, that is, the customer server is checked in, processing continues with taking another snapshot of the customer server at processing block 720. Change data is generated and recorded at processing block 725 by comparing the snapshots taken at check out and check in. Finally, periodic auditing is resumed at processing block 730.

Figure 8:
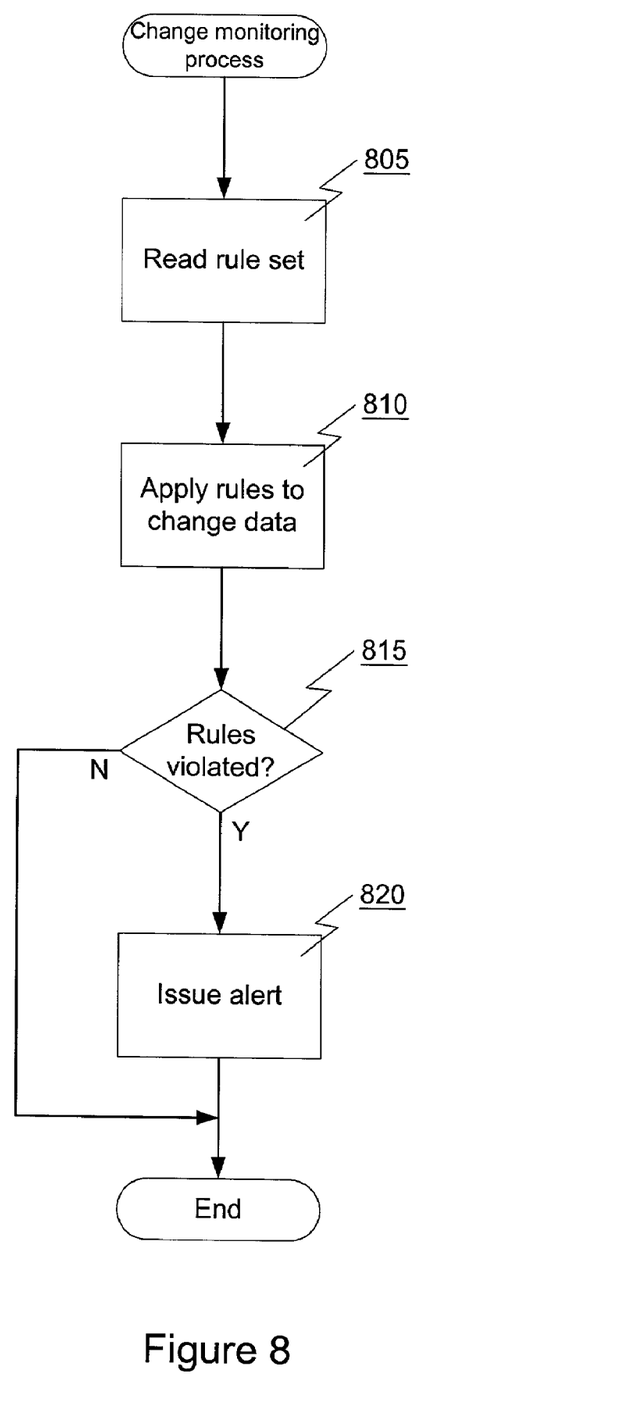
FIG. 8 is a flowchart illustrating a change monitoring process according to one embodiment of the present invention.

FIG. 8 is a flowchart illustrating a change monitoring process according to one embodiment of the present invention. Initially, at processing block 805, the rule set is read. The rules are then applied to the change data at processing block 810. That is, the change data is read and the limits and requirements of the rules are checked to against the change data to determine whether these limits and requirements are satisfied. If, at decision block 815, the rules are found to be violated, the corresponding alert is issued at processing block 820.

What is claimed is:

1. A computer implemented method for tracking changes to a customer system in a managed hosting environment, the method comprising:
   detecting predetermined audit intervals to perform periodic audits;
   performing the periodic audits of the customer system in accordance with the predetermined audit intervals, the performing of the periodic audits includes executing an agent program that is resident on the customer system and that collects audit data to be transferred to an application server connected with the customer system via a network; and
   transferring the audit data to the application server, the application server to perform a comparison of the audit data with previous audit data to detect changes to the customer system; and
   correlating the audit data and a set of rules with previous failures and previous security attacks to develop change patterns, wherein the change patterns are used to predict one or more of the following: future failures and future security attacks.

2. The method of claim 1, wherein the performing of the periodic audits comprises storing the changes on a database server connected with the application server via the network.

3. The method of claim 2, wherein the audit data comprises operating system files, file system, registry, and application software files of the customer system.

4. The method of claim 2, wherein the changes are compressed and encrypted prior to being stored.

5. The method of claim 2, further comprising:
   reading the set of rules from the database server;
   applying the set of rules to the change data to determine whether any of the set of rules has been violated; and
   responsive to a violation of any of the set of rules, taking an action associated with a rule violated.

6. The method of claim 5, wherein the rules are stored on the database server.

7. The method of claim 1, further comprising:
   checking out the customer system from the application server to allow the application server to make the changes to software of the customer system;
   suspending the periodic audits;
   taking a first snapshot of the customer system;
   checking in the customer system when the changes to the software of the customer system have been completed;
   taking a second snapshot of the customer system;
   generating change data on the application server by comparing the first snapshot and the second snapshot;
   storing the change data on the database server; and
   resuming the periodic audits.

8. The method of claim 7, wherein the first and second snapshots comprise operating system files, file system, registry, and application software files of the customer system.

9. The method of claim 7, wherein the change data is compressed and encrypted prior to being stored.

10. A system, comprising:
    a customer system available to a customer in a managed hosting server, the customer system having an agent program to detect predetermined audit intervals to perform periodic audits, to perform the periodic audits, and to collect audit data to be transferred to an application server;
    the application server connected with the customer system via a network to perform a comparison of the audit data with previous audit data to detect changes to the customer system;
    a database server connected with the application server via the network to store changes detected by the application server, wherein the database server includes a rules engine, the rules engine to correlate the audit data and a set of rules with previous failures and previous security attacks to develop change patterns, wherein the change patterns are used to predict one or more of the following: future failures and future security attacks;
    a report server connected with the database server via the network to generate reports based on the changes stored on the database server; and
    a command center connected with the application server and the report server via the network to retrieve reports from the report server.

11. The system of claim 10, wherein customer system is further to execute the agent program, and to collect snapshot data responsive to a request from the application server.

12. The system of claim 10, wherein the application sever is further to:
    store the changes on the database server.

13. The system of claim 12, wherein the application server compresses and encrypts the changes before storing the changes on the database server.

14. The system of claim 10, wherein the application server is further to:
    check out the customer system to allow the application server to make the changes to software of the customer system;
    suspend the periodic audits;
    take a first snapshot of the customer system;
    check in the customer system when the changes to the software of the customer system have been completed;
    take a second snapshot of the customer system;
    generate change data by comparing the first snapshot and the second snapshot;
    store the change data on the database server; and
    resume the periodic audits.

15. A machine-readable medium having stored thereon data representing sets of instructions which, when executed by a machine, cause the machine to:
    detect predetermined audit intervals to perform periodic audits;
    perform the periodic audits of a customer system in accordance with the predetermined audit intervals, the performing of the periodic audits includes executing an agent program that is resident on the customer system and that collects audit data to be transferred to an application server connected with the customer system via a network;

transfer the audit data to the application server, the application server to perform a comparison of the audit data with previous audit data to detect changes to the customer system; and correlating the audit data and a set of rules with previous failures and previous security attacks to develop change patterns, wherein the change patterns are used to predict one or more of the following: future failures and future security attacks.

16. The machine-readable medium of claim 15, wherein the performing of the periodic audits comprises storing the changes on a database server connected with the application server via the network.

17. The machine-readable medium of claim 16, wherein the audit data comprises operating system files, file system, registry, and application software files of the customer system.

18. The machine-readable medium of claim 16, wherein the changes are compressed and encrypted prior to being stored.

19. The machine-readable medium of claim 16, wherein the sets of instructions which, when executed by the machine, further cause the machine to:

read the set of rules from the database server;

apply the set of rules to the change data to determine whether any of the set of rules has been violated; and responsive to a violation of any of the set of rules, take an action associated with a rule violated.

20. The machine-readable medium of claim 19, wherein the rules are stored on the database server.

21. The machine-readable medium of claim 15, wherein the sets of instructions which, when executed by the machine, further cause the machine to:

check out the customer system from the application server to allow the application server to make the changes to the software of the customer system;

suspend the periodic audits;

take a first snapshot of the customer system;

check in the customer system when the changes to the software of the customer system have been completed;

take a second snapshot of the customer system;

generate change data on the application server by comparing the first snapshot and the second snapshot;

store the change data on the database server; and resume the periodic audits.

22. The machine-readable medium of claim 21, wherein the first and second snapshots comprise operating system files, file system, registry, and application software files of the customer system.

23. The machine-readable medium of claim 21, wherein the change data is compressed and encrypted prior to being stored.

24. An apparatus, comprising:

a customer system available to a customer in a managed hosting server, the customer system having an agent program to detect predetermined audit intervals to perform periodic audits, to perform the periodic audits, and to collect audit data to be transferred to an application server;

the application server connected with the customer system via a network to perform a comparison of the audit data with previous audit data to detect changes to the customer system; and a rules engine coupled to the application server, the rules engine to correlate the audit data and a set of rules with previous failures and previous security attacks to develop change patterns, wherein the change patterns are used to predict one or more of the following: future failures and future security attacks.

25. The apparatus of claim 24, further comprising:

a database server connected with the application server via the network to store changes detected by the application server;

a report server connected with the database server via the network to generate reports based on the changes stored on the database server; and a command center connected with the application server and the report server via the network to retrieve reports from the report server.

26. The apparatus of claim 24, wherein the customer system is further to execute the agent program, and to collect snapshot data responsive to a request from the application server.

27. The apparatus of claim 24, wherein the application sever is further to store the changes on the database server.

28. The apparatus of claim 27, wherein the application server compresses and encrypts the changes before storing the changes on the database server.

29. The system of claim 24, wherein the application server is further to:

check out the customer system to allow the application server to make the changes to software of the customer system;

suspend the periodic audits;

take a first snapshot of the customer system;

check in the customer system when the changes to the software of the customer system have been completed;

take a second snapshot of the customer system;

generate change data by comparing the first snapshot and the second snapshot;

store the change data on the database server; and resume the periodic audits.

* * * * *